United States Patent Office 3,493,642
Patented Feb. 3, 1970

3,493,642
METHOD OF PREPARING AGGLOMERATES OF REDUCED EFFLORESCENCE
Charles Edward Capes and Allan Edward McIlhinney, Ottawa, Ontario, Canada, assignors to Canadian Patents and Development Limited, a company of Canada
Filed Feb. 26, 1968, Ser. No. 708,321
Int. Cl. C09c 3/00
U.S. Cl. 264—117                                    13 Claims

ABSTRACT OF THE DISCLOSURE

A method of agglomerating particulate material in which an inverse thermal gelling agent is mixed with a bridging liquid solution of binder solute. The particles and bridging liquid solution including the gelling agent are subjected to an agglomerating operation, the temperature of the formed agglomerates raised to cause gell formation, and the bridging liquid therein evaporated from the gell. The binder solute (and gelling agent) are uniformly deposited as bridge between the particles of the agglomerates over the entire cross-section as the liquid is removed.

---

Figure 1:
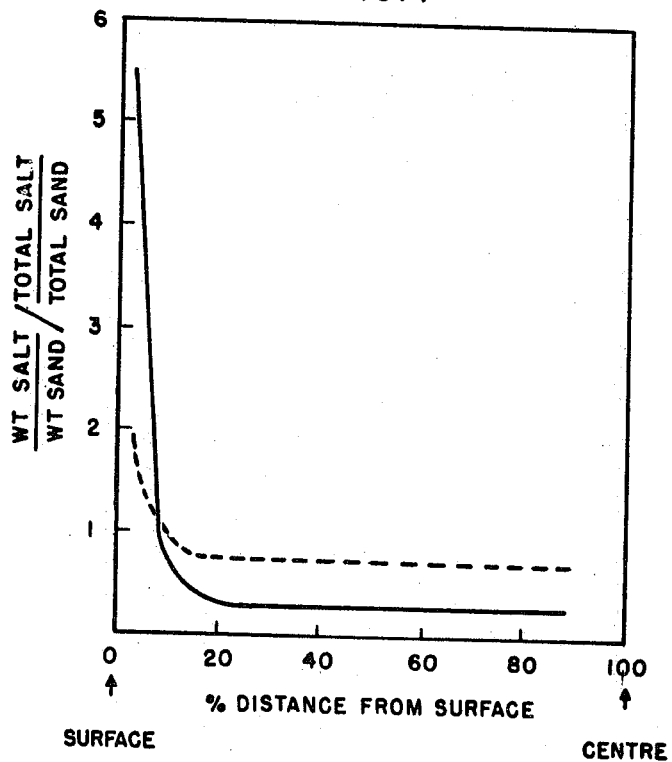

A common method of forming larger agglomerates from fine powders is by the balling or wet pelletization process. During their formation, the moist agglomerates are held together by capillary binding forces due to the liquid held in the pores between the constituent particles. These binding forces disappear, however, upon drying of the moist agglomerate (or removal of binding liquid) resulting in its disintegration.

Soluble salts are often added to the bridging liquid in industrial pelletizing processes so as to maintain permanent binding of the agglomerates through crystallized salt bridges between the primary particles. During the drying of moist agglomerates which contain dissolved salts. The majority of the liquid is sucked up to the surface of the pellet by capillary action with the result that most of the salt accumulates in the outer layers of the agglomerate and forms a crust.

This crust formation, known as efflorescence, leads to certain undesirable properties in the pellets. The strength of such a pellet would be merely the hoop strength of the hard outer shell, the core contributing little or nothing to it. A more even distribution of solute bridges would lead to greater strength. As crust formation proceeds, the rate of drying of the agglomerate is found to be greatly reduced since the impermeable surface layer blocks the path for moisture release. In addition it may be desirable to have a homogeneous deposition of solute inside the agglomerate for its own sake and the phenomenon of efflorescence prevents this. Examples in this category are mentioned below.

Two previously described methods of circumventing the efflorescence problem to produce homogeneous agglomerates may be noted. One technique involves forming the agglomerates in consecutive layers, with a drying stage after the addition of each thin layer. This method requires special and costly equipment. A second method which has been suggested involves arresting the drying when a continuous network of liquid still exists in the pores of the agglomerate, so as to allow the salt deposited in the outer layers to redissolve and slowly to diffuse back into the interior of the mass. This operation is so time consuming as to be impractical.

In the present invention, efflorescence is reduced by the addition of an inverse thermal gelling agent to the bridging liquid prior to the balling or agglomeration operation. An inverse thermal gel is a suspension in which gelation occurs when the temperature is raised; for example, corn starch suspended in water is such a system. The transformation of the bridging liquid inside the agglomerate to a highly viscous material in the early stages of drying at elevated temperature prevents the liquid from being sucked to the surface of the agglomerate. Liquid removal in drying is then primarily by vapour diffusion and the solutes are deposited in situ leading to a reasonably homogeneous agglomerate. The following experimental evidence shows this reasoning is valid.

The gelling agents which are suitable thicken or gel the bridging liquid as its temperature is raised—and before a significant amount of internal liquid migrates to the surface to replace evaporating liquid. The gelling time should be short compared to total drying time. The gelling agents should cause the desired thickening or gelation at elevated temperatures up to about 10° C. below the drying temperature. For aqueous liquids, gelling agents such as starches and flour from various sources, and methyl cellulose have been found suitable. For organic liquids, many salts of higher fatty acids e.g. aluminum stearate, sodium stearate, aluminum palmitate and aluminum linoleate, will act as inverse thermal gelling agents. The concentration of the gelling agent is not critical and may range up to about 20% w./v. i.e. weight of gelling agent per volume of the bridging liquid. As low as about 1% will give a suitable viscous gel in some instances, with about 5–15% preferred.

The amount of solute in the bridging liquid is usually chosen to be close to the saturation concentration—however about 50–100% of the saturation concentration may be used. The solute may be any salt or soluble binder.

The amount of bridging liquid used is not critical and depends on the particle size and size distribution, and the desired agglomerate size. A suitable range is about 10 to about 50% by volume based on the particles.

Figure 2:
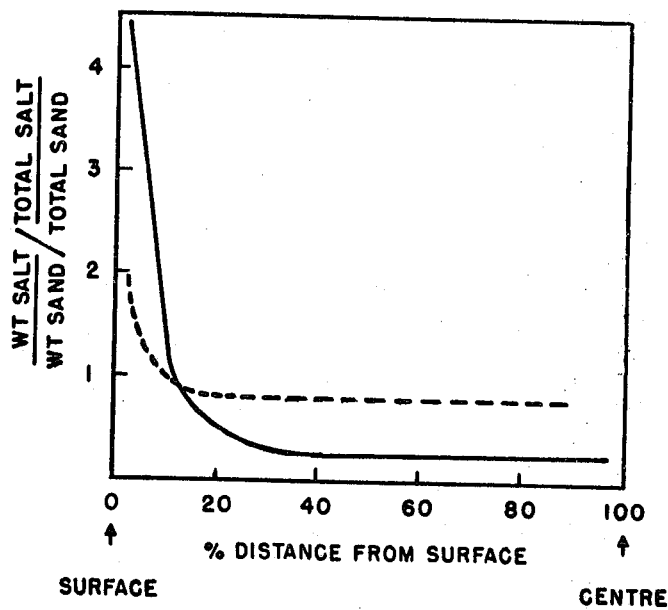
Figure 3:
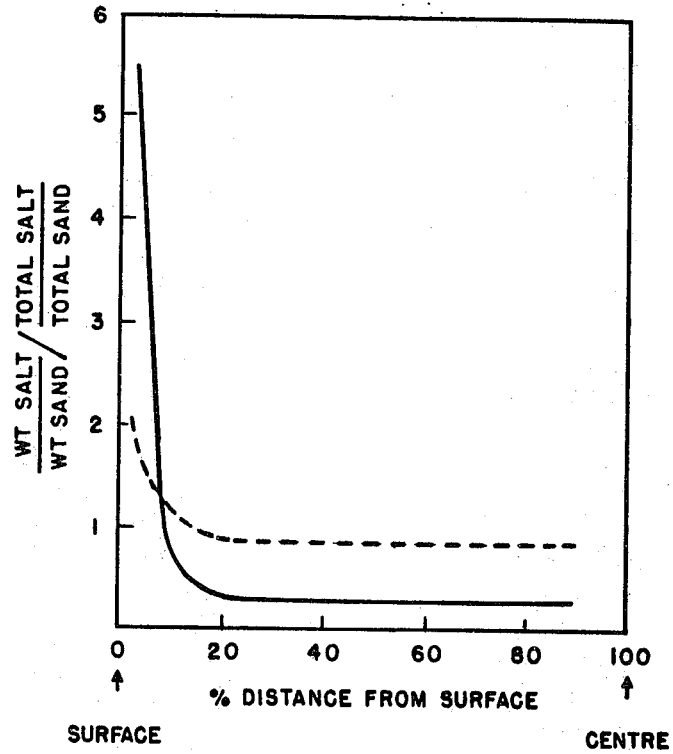
Figure 4:
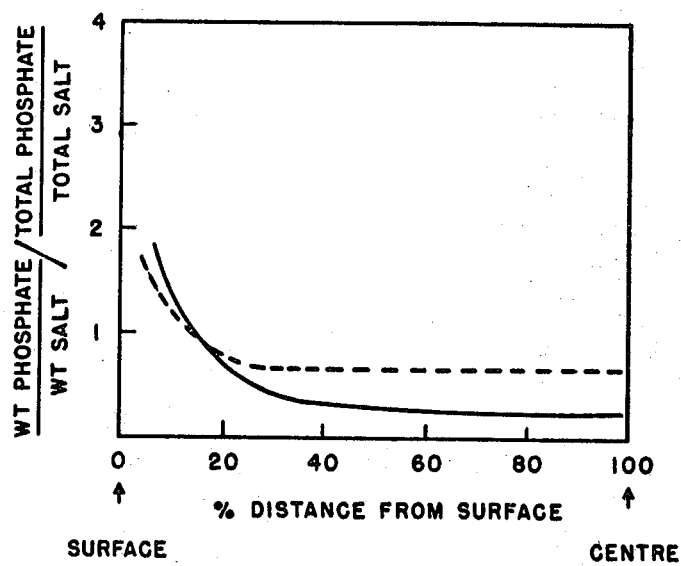

In the attached graphs:
FIGURE 1 shows the distribution of salt from the surface to centre of agglomerates of fine sand with and without the gelling agent;
FIGURE 2 shows similar decreases in salt content from the surface toward the centre of agglomerates of very fine uniform sand;
FIGURE 3 depicts the similar changes in salt content in sand agglomerates with a different gelling agent; and
FIGURE 4 depicts the distribution of a phosphate salt in agglomerates of sodium chloride powder.

AGGLOMERATION PROCEDURE

The spherical agglomerates discussed in the following examples were produced in the drum and by the procedure previously described in the United States patent application, Ser. No. 519,145 "Continuous Sphere Formation" by Capes et al. Generally about 50 cubic centimetres of the dry powder to be agglomerated was suspended in 100 cubic centimetres of petroleum spirits or water (for hydrophilic or hydrophobic powders respectively) in the drum. This suspension was tumbled, and the binding liquid was sprayed into the drum to form agglomerate nuclei. Dry powder and binding liquid were then added in appropriate quantities until balls of the required size were obtained. When larger balls were required (greater than ½ inch diameter) it was necessary to remove pellets as their size increased, since the relatively small drum could accommodate only a few larger pellets.

The following table gives the approximate proportions of binding liquid and powder used to form agglomerates in the examples.

TABLE I

| Powder: | Binding liquid quantity in cc./g. powder |
|---|---|
| −150 mesh sand | 0.20 |
| 31–44 micron sand | 0.28 |
| −300 mesh graphite powder | 0.50 |
| −100 mesh NaCl powder | 0.15 |

Of course, other balling or agglomeration techniques could be used as well.

EXAMPLE 1

Spherical agglomerates in the diameter range of 0.6–0.8 inch were made from two sizes of silica sand using a saturated solution of NaCl in water as the binding liquid. In each case two types of balls were made, those with only NaCl in the binding liquid, and those with, in addition to the NaCl, 10% w./v. of an inverse thermal gelling agent. Two different gelling agents suitable for use in aqueous solutions were used, as is seen in the following table.

TABLE II

| Powder agglomerated | Gelling agent | NaCl distribution |
|---|---|---|
| −150 mesh sand | Corn starch | See Figure 1. |
| −31 to 44 micron sand | do | See Figure 2. |
| −150 mesh sand | Wheat flour | See Figure 3. |

The agglomerates were dried at 110° C. and then the salt distribution was determined by skimming off thin concentric layers and estimating their NaCl content by chemical analysis. The results are shown in FIGURES 1 to 3 by plotting the ratio of the salt content as a fraction of the dry sand in the layers to salt content as a fraction of the dry sand in the whole ball against the mean distance of the samples from the surface of the ball. Obviously an agglomerate in which the NaCl distribution is completely uniform (no efflorescence) will appear as a horizontal line at unity on the vertical axis in this type of plot. The distributions given in FIGURES 1, 2 and 3 (solid lines) are typical of agglomerates in which efflorescence occurs. There is a very high concentration of salt at the surface of the ball, and very little salt in the core. In FIGURES 1, 2 and 3 (dotted lines) in which the gelling agents were incorporated, it is seen that the salt concentration has been reduced considerably at the surface while, even more significantly, the concentration in the core has approached more closely the ideal value of unity. These results indicate that there has been a significant reduction in efflorescence in the case when a gelling agent was used and this fact will be verified in the examples below which indicate the effect of this reduction on the strength and drying properties of the agglomerates.

The sand/NaCl system was used in the above example due to its simplicity and ease of analysis. The results of the experiments with this model system indicate that components dissolved in the binding liquid during the balling of powders may be dispersed more uniformly in the dried agglomerates by the use of a selected gelling agent. Practical examples in which this might be necessary are the preparation of free-flowing agglomerates of a powder for feeding to a tabletting operation where the dispersed component might be a lubricant; or the pelletization of solid components for a subsequent process. In this latter case it might be desirable to pelletize the materials for ease of handling and transportation but then to reduce the agglomerates to a smaller size prior to use (e.g. for greater reactivity in a chemical reaction, for incorporation in a larger mixture for reshaping and sintering etc.). The desirability of having homogeneous agglomerates in such an operation is evident. The material dissolved in the binding liquid might also be a catalytic salt which it is necessary to disperse uniformly throughout the individual agglomerates of a pelletized catalyst support.

EXAMPLE 2

Cylindrical agglomerates (1 in. dia. x 1½ in. long) were made from −300 mesh graphite powder held together in a wet state by a toluene solution. The agglomerates were formed using an appropriate die and punch set and moderate pressures. Two types of agglomerates were made, those in which the toluene bridging liquid contained 25% (w./v.) of m-terphenyl and those in which the bridging liquid contained 10% (w./v.) of aluminum stearate in addition to the m-terphenyl. The agglomerates were dried at 75° C., and examination of the dried products showed that those which contained the aluminum stearate gelling agent had only a few specks of effloresced white solute (m-terphenyl) on their surfaces and were essentially the black colour of the graphite, while those which did not contain the gelling agent had a very white surface caused by the wide-spread efflorescence of the solute.

EXAMPLE 3

This example concerns the improvement in strength which can be realized in agglomerates in which a more uniform distribution of binder is present because of the reduction in efflorescence.

The strength of dried spherical agglomerates ranging in size from 0.15 in. to 1.2 in. was measured by crushing the balls between flat parallel plates and measuring the load required for failure. For a given type of agglomerate, the crushing loads were correlated by the equation $$L = kd^n$$

where L is the crushing load in pounds, $d$ is the ball diameter in inches, and $K$ and $\eta$ are constants. Ideally $\eta$ has a value of 2 when a completely uniform (as concerns strength properties) ball is crushed and a value of 1 when the strength of the ball is concentrated in a thin layer at its surface (hoop strength). The data were fitted to the above equation by the method of least squares. The results of the experiments are detailed in the following Table III.

In the case of both the graphite and sand pellets containing no gelling agent, the results are consistent with what can be expected when efflorescence takes place. The crushing strengths are relatively low, and the exponent $\eta$ has a value close to one as is expected when the strength-providing binder is concentrated near the surface of the balls. When the gelling agent is used in addition to the dissolved binder, much higher crushing strengths are realized and $\eta$ has a value closer to 2 consistent with agglomerates in which the strength-developing binding materials are more uniformly dispersed in the balls.

It might be argued that the increase in strength found

TABLE III.—SPHERICAL AGGLOMERATES

| Powder used | Bridging liquid | Dissolved binder (solute) | Gelling agent | Drying temp., °C. | Crushing strength equation, $L = kd^\eta$ |
|---|---|---|---|---|---|
| −150 mesh sand | Water | Saturated NaCl | None | 110 | $L = 1.9 d^{0.94}$ |
| Do | do | None | 10% w./v. corn starch | 110 | $L = 58.4 d^{1.26}$ |
| Do | do | Saturated NaCl | do | 110 | $L = 233.3 d^{1.55}$ |
| −300 mesh graphite | Toluene | Petroleum resin [1] | None | 75 | $L = 12.9 d^{1.1}$ |
| Do | do | None | 20% w./v. aluminum stearate | 75 | $L = 10 d^{2.2}$ |
| Do | do | Petroleum resin [1] | 10% w./v. aluminum stearate | 75 | $L = 49 d^{1.75}$ |
| Do | do | do.[1] | 20% w./v. aluminum stearate | 75 | $L = 67.8 d^{2.2}$ |

[1] 20% w./v. Imperial Oil Ltd. petroleum resin, 305° F. softening point.

when starch and aluminum strearate are used in addition to the NaCl and petroleum resin respectively, is due simply to the higher concentration of binder present in the balls. However, the increased strength has been shown to result from, in addition to the increased amount of binder present, a more favourable (uniform) dispersion of binders due to the reduction of efflorescence. This is evident from the synergestic effect seen in Table III; the strength of the balls containing both binder and gelling agent is much greater than the simple sum of the strengths of the balls with binder and gelling agent present alone.

Corroborating evidence for the improvement in the strength for the sand balls when corn starch was incorporated was readily apparent on visual examination. The balls containing only NaCl as binder had a fragile surface layer of salt with a weak, friable interior. The balls which had a gelling agent e.g. corn starch added to prevent efflorescence had a distinctly different appearance. The surface layer of salt had disappeared while the interior was very strong as was evidenced by the clean cross-sectional cut through the pellet which was possible.

The graphite pellets of this example would be useful as a tower packing material for corrosive service.

EXAMPLE 4

The build-up of a surface layer of soluble salts during the drying of an agglomerate leads to the blocking of surface pores and a drastic reduction in drying rate. For example, some balls 0.8 in. in diameter made from the −150 mesh sand and held together only by water were dried in a low humidity air stream ( 1 ft./sec.) at 100° C. from 18% moisture (dry basis) to 1% moisture in approximately 20 minutes. Similar balls held together by a saturated solution of NaCl in water dried under the same conditions required approximately 180 minutes to accomplish the same amount of drying. When corn starch (10% w./v. in binding liquid) was incorporated as gelling agent, however, 60 minutes were required to dry balls held together by the saturated NaCl solution.

It is somewhat surprising that the balls containing gelling agent showed improved drying times. Although the gelling agent reduces the blocking of the surface pores by effloresced salt, moisture release is then possible primarily by vapour diffusion from the interior of the balls which is a very slow process compared with capillary transport of less viscous binding liquids to the surface. In fact, some preliminary experiments on the drying rates of ¼ in. KCl balls held together by saturated KCl solution indicate no improvement in drying behaviour when a gelling agent is used. However, the experiments with sand/NaCl balls cited above show that increased drying rates may result when a gelling agent is used to reduce efflorescence, particularly when the solid is insoluble and inert with respect to the liquid.

EXAMPLE 5

This example illustrates the use of a gelling agent (potato starch) in the formulation of agglomerates of a road de-icing compound.

It is the practice in some locatities to add a corrosion inhibitor to the rock salt used to de-ice roads. The inhibitor is often mixed dry with the salt particles as a fine powder which coats the coarser salt particles. In use the inhibitor dissolves first and is no longer present when the majority of the salt remains undissolved. It is suggested that a more efficient scheme would be to disperse the corrosion inhibitor throughout a salt agglomerate so that it would be present over the whole period of action of the salt.

Salt agglomerates (⅜ inch to one inch diameter) were formed from the −100 mesh sodium chloride powder. One batch of agglomerates was made using a bridging liquid which contained 66 weight percent water, 21 weight percent sodium chloride, and 13 weight percent sodium metaphosphate (a reported corrosion inhibitor). A second batch of agglomerates was made using the same bridging liquid as in the first case, except that 10% w./v. of potato starch was added as gelling agent. The agglomerates were dried at 110° C., were sectioned as described in Example 1, and chemically analyzed for sodium metaphosphate (Calgon) and sodium chloride.

The results of the analyses are plotted in FIGURE 4 in the same fashion used in FIGURES 1 to 3. In both sets of agglomerates, the phosphate has been distributed throughout the balls, although a build-up of the inhibitor at the surface with a lower concentration in the core persists in each case. The agglomerates containing potato starch gelling agent, however, have a concentration of phosphate in the core closer to the ideal value of unity than do those containing no gelling agent. The average phosphate concentration in the balls was about 2 wt. percent.

EXAMPLE 6

Ideally during the dissolution of such salts agglomerates containing a corrosion inhibitor, the inhibitor should be released in constant proportion to the salt released (i.e.

$$\left(\frac{\Delta \text{ phosphate}}{\Delta \text{ NaCl}}\right) \text{dissolution}$$

should be constant). Some dissolution tests were performed on the agglomerates by dissolving them singly in 5 litres of water in a spherical container. The water was continuously recycled in an external loop (by means of a pump) to provide agitation such that the solution entered at the bottom of the sphere (container) and overflowed at the top. The salt agglomerate tended to sit at the lower water inlet where a ⅝ inch ball dissolved in approximately 5 minutes. The balls dissolved reasonably uniformly and retained an approximately spherical shape throughout the experiment. The phosphate and NaCl levels in the aqueous solution were monitored in the external loop by electrochemical means.

As would be expected due to the persistence of efflorescence, both types of salt agglomerates showed initial rates of phosphate release with respect to the NaCl release which were higher than the average rate of release for the whole ball. The rate of release for balls containing no potato starch climbed to a higher level than that for the balls containing the gelling agent. During the dissolution of the latter 60% of the mass of the agglomerates, however, the rate of phosphate release was fairly constant at a level lower than the average rate of release for the whole ball. During this latter stage, the balls containing no potato starch showed a rate of phosphate release of 70(±2)% of the average rate for the whole ball while those containing potato starch showed a rate of 79 (±1)% of the average rate. The rate of phosphate release for the balls containing gelling agent more closely approached the average (or ideal) rate than did the rate for the balls containing no gelling agent.

What is claimed is:

1. A method of agglomerating particulate material in which bridging liquid solution is mixed with an inverse thermal gelling agent to prevent efflorescence or crust formation on removing said bridging liquid, comprising:
    (a) preparing a solution of binder solute in a bridging liquid and incorporating an inverse thermal gelling agent which will gell said solution before evaporation of the bridging liquid proceeeds,
    (b) intermingling the particulate material with said solution containing the gelling agent in an agglomeration operation to form agglomerates wherein said solution and gelling agent are uniformly dispersed,
    (c) heating the agglomerates until the gelling agent has gelled said solution throughout the agglomerates,
    (d) evaporating the bridging liquid from the agglomerates, the gell minimizing migration of the binder solute to the surface of said agglomerates, and (e) recovering said formed agglomerates containing binder solute and gelling agent substantially uniformly dispersed therein.

2. The method of claim 1 wherein the binder solute is a salt, forming bridges between particles of said particulate material on removing said bridging liquid.

3. The method of claim 2 wherein the salt is an alkali metal halide.

4. The method of claim 2 wherein the salt is an alkaline earth metal halide.

5. The method of claim 1 wherein the binder solute is present in from about 50–100% of saturation of said bridging liquid.

6. The method of claim 1 wherein a resinous binder is dissolved in the bridging liquid.

7. The method of claim 1 wherein the gelling agent is a starch.

8. The method of claim 1 wherein the gelling agent is a flour.

9. The method of claim 1 wherein the gelling agent is methyl cellulose.

10. The method of claim 1 wherein the gelling agent is a salt of a higher fatty acid.

11. The method of claim 1 wherein the gelling agent concentration is not more than about 20% w./v. of the bridging liquid.

12. The method of claim 1 wherein the bridging liquid is aqueous, the gelling agent is a starch, and the evaporation temperature is about 100° C.

13. The method of claim 1 wherein the bridging liquid is aqueous, the gelling agent is a flour and the evaporation temperature is about 100° C.

References Cited

UNITED STATES PATENTS 1,035,830 8/1912 Anderson.
2,970,063 1/1961 Jordan et al.

OTHER REFERENCES

Particulate Technology by Clyde Orr, Jr., The Macmillan Co., p. 430, 1966.

ROBERT F. WHITE, Primary Examiner

J. R. HALL, Assistant Examiner

U.S. Cl. X.R.

23—313